Patented June 22, 1943

2,322,667

UNITED STATES PATENT OFFICE 2,322,667

MOLD AND MOLD COMPOSITION

John B. Seastone, Wilkinsburg, and William E. Mahin, Oakmont, Pa., assignors to Westinghouse Electric & Manufacturing Company, East Pittsburgh, Pa., a corporation of Pennsylvania No Drawing. Application July 31, 1942,
Serial No. 453,030

10 Claims. (Cl. 22—188)

This invention relates to molds, and particularly to foraminous molds and mold composition.

Heretofore many attempts have been made to produce foraminous molds and many suggestions have been made for increasing the porosity of existing mold material. Such porosity is desirable in order that the air and gas will exude through the walls of the mold cavity during the pouring of metal into the mold.

Sand molds are known to be somewhat porous but it has been impossible to obtain smooth surfaces with such material. Recently a gypsum mold has been produced having a fair degree of porosity, but such material is limited in strength as well as being limited in use, it being found impossible to employ such gypsum molds for the pouring of ferrous metals.

It is an object of this invention to provide a foraminous foundry mold.

Another object of this invention is to provide a foraminous foundry mold consisting mainly of silica flour and a binder.

A more specific object of this invention is to provide a foundry mold composition suitable for the making of a foraminous mold.

Other objects of this invention will become apparent from the following description when taken in conjunction with the appended claims.

In practicing this invention, a mixture of silica flour and waterglass to which a predetermined amount of water is added, with or without a predetermined amount of pine resin, is utilized as a basic mold composition. In general, the composition comprises a mixture of from 85% to 98% by weight of silica flour having a very fine particle size and from 15% to 2% by weight of waterglass, and from 5 to 25 parts by weight of water added to 100 parts by weight of the mixture, with or without 2 to 15 parts by weight of pine resin or other organic binder added to 100 parts by weight of the mixture, with or without 2 to 15 parts by weight of pine resin or other organic binder added to 100 parts by weight of the mixture. Preferably the silica flour employed has such a fineness that 90% to 95% of the flour passes through a 270 mesh sieve with the balance passing through a 200 mesh sieve.

The waterglass acts as a binder for the silica flour while the organic binder, where employed, is utilized for rendering the resulting mold porous. Where the organic binder is not present as an essential element of the composition, the mold composition preferably consists of a mixture of 92% to 98% silica flour and 8% to 2% waterglass with from 5 to 25 parts of water added to 100 parts of the mixture.

The very fine grain size of the silica flour is necessary in order to produce a mold having an extremely smooth surface or skin. The inorganic binder imparts strength to the mold, it being found that where less than 2% waterglass is employed, the resulting mold crumbles and flakes. The strength of the mold is greatly increased by increasing the amount of inorganic binder employed, although in this particular embodiment about 15% of waterglass appears to be the maximum required to give satisfactory properties.

The limits of the range of the waterglass content given hereinbefore are established for a 32% sodium silicate solution, such solution being readily obtained on the open market. Of course it is understood that if the concentration of the sodium silicate solution is varied, the limits of the waterglass and water contents of the composition will vary accordingly, smaller quantities of waterglass and larger quantities of water being necessary where the solution is more concentrated.

The mixture of silica flour and waterglass, with or without the organic binder within the ranges given hereinbefore is preferably well mixed, after which from 5 to 25 parts of water are added to 100 parts of the mixture. The resulting composition is fairly dry and after being well compounded as by mulling or otherwise mixing to obtain a homogeneous composition can be rammed in a flask containing a pattern to produce a green mold having good strength and reproduction of pattern detail. The ramming of the mold composition can be by hand, by impact or under pressure, it being noted that the best reproduction of detail of the pattern is obtained where the mold composition is rammed under pressure as high as four tons to the square inch.

After ramming the mold composition in the flask, the flask is readily removed and the green mold is then placed in a suitable oven and subjected to a temperature preferably between 400° C. and 800° C. for a period of time of ½ to 5 hours to free it of all volatile matter. Preferably the green mold is baked on grids in a furnace, with the grids having a minimum contact supporting surface, low expansion and contraction characteristics, and good strength at temperatures up to higher than the baking temperature. In baking the mold, it is preferably heated up to the baking temperature gradually or in steps beginning as low as 100° C. and cooled in the furnace slowly or in steps from the baking temperature to about 200° C. before exposing the baked mold to the room atmosphere. A heating and cooling rate of about 20° C. per minute gives good results, it having been found that faster rates may cause small cracks to form in the mold. In general, a baking time at maximum temperature of three quarters of an hour per inch of mold thickness is desirable for a baking temperature of about 760° C. During the baking substantially all of the volatile constituents of the mold composition are driven off, leaving a homogeneously distributed network of voids throughout the mold.

In order to insure against sticking of the cast metal in the mold, it is preferred to apply a thin film of a mold wash to the mold. The mold wash may be applied by spraying or brushing the mold. A mold wash of plumbago blackening (1% to 10% plumbago with 99% to 90% commercial alcohol) or linseed oil and turpentine is easily sprayed on the surface of the mold or dry plumbago may be brushed directly onto the surface of the mold.

The mold wash is preferably applied to the green mold so that normal baking of the green mold will remove all volatile matter from the wash. However, the wash may be applied to the mold after the baking treatment, in which case it is then necessary to subject the sprayed mold to another baking treatment at a temperature of at least 200° C. for a period of not less than one hour to insure the removal of all volatile matter. Good castings have been produced from all such prepared molds.

As examples of the results obtained on molds formed from the molding compositions comprising silica flour, waterglass and water within the ranges given hereinbefore, reference may be had to the following table:

is readily reclaimed by pulverizing the used mold stock to a fineness where it passes through a 270 mesh sieve and then adding waterglass and water in predetermined amounts within the ranges given, after which the composition may be rammed to again form a green mold and baked to drive off the volatile matters and provide the foraminous structure. Mix No. 6R given in the foregoing table is a reclaimed composition, namely, the used mold resulting from mix No. 6, and is an excellent illustration of the strength and permeability obtained with such reclaimed materials.

Although the results illustrated in the foregoing table are based on baked molds, the green-mold composition also has excellent strength. As indicative of the strength of the greenmold reference may be had to the shear and compression strength of the green mold composition identified in the foregoing table as mix No. 6. This particular mix had a green shear strength of two pounds per square inch and a green compression strength of 9.7 pounds per square inch. Comparable results can be obtained with other compositions within the range given hereinbefore.

As specific examples of the results which can be obtained on molds formed from the mold composition containing from 2 to 15 parts of pine

| Mix No. | Composition | | | Data on baked mold | | | | Specific gravity |
|---|---|---|---|---|---|---|---|---|
| | Silica flour | Water-glass | Water | Dry permeability | Dry shear | Mold hardness (Dietert test) | | |
| | Percent | Percent | Parts | | Lbs./sq. in. | | | |
| 2 | 98 | 2 | 18 | 3 | 11.6 | 96 | | 1.20 |
| 4 | 96 | 4 | 6 | 2 | 28.0 | 96 | | 1.21 |
| 5 | 96 | 4 | 12 | 4 | 32.0 | 98 | | 1.19 |
| 6 | 96 | 4 | 18 | 6 | 39.1 | 99 | | 1.17 |
| 7 | 96 | 4 | 24 | 7 | 44.5 | 99 | | 1.16 |
| 8A | 92 | 8 | 6 | 10 | 20 | 97 | | |
| 8B | 92 | 8 | 18 | 10 | Over 70 | 100 | | |
| 9 | 90 | 10 | 10 | 11 | Over 70 | 100 | | |
| 6R | 96 | 4 | 18 | 6 | 52.3 | 99 | | 1.02 |

The data given in the foregoing table are based on molds produced from the molding compositions identified by the mix number after having been baked within the preferred range given hereinbefore, it being noted that the baked molds have excellent physical characteristics and permeability. The dry permeability listed in the table is a standard measure of the number of cubic centimeters of air which it is possible to pass through the baked mold per minute as found by the standard AFA permeability test, and is an excellent indication of the amount of voids present in the baked mold.

After the baked molds have been employed in the casting of metals, the mold composition resin per 100 parts of the mixture of silica flour and waterglass, reference may be had to the following table:

| Mix No. | Composition | | | | Data on baked mold | | | Specific gravity |
|---|---|---|---|---|---|---|---|---|
| | Silica flour | Water-glass | Pine resin | Water | Dry permeability | Dry shear | Mold hardness (Dietert test) | |
| | Per cent | Per cent | Parts | Parts | | Lbs./sq. in. | | |
| 14 | 90 | 10 | 10.5 | 15 | 6 | 13.2 | 97 | 1.11 |
| 15 | 95.5 | 4.5 | 11.1 | 18 | 10 | 28.8 | | 1.03 |
| 16 | 93.3 | 6.7 | 11.1 | 25 | 19 | 5.3 | | 1.04 |
| 17 | 89 | 11 | 10 | 15 | 35 | 33.4 | | 1.00 |

The results given for mix Nos. 14, 15, 16 and 17 of the foregoing table are based on molds of the given compositions which were baked within the preferred range of 400° C. to 800° C., it being noted that very good results as to permeability and shear strength are obtained. In the baking of the mold compositions containing pine resin, all of the volatile matter of the pine resin, sodium silicate solution and water are readily removed, leaving a very dry and porous mold. It is to be noted that where pine resin is employed in the molding composition, care must be exercised in mixing the composition to effect an even distribution of the pine resin and to prevent its agglomerating at the surface of the mold. The molds formed from the molding composition containing pine resin can readily be reclaimed in the same manner referred to hereinbefore with respect to the compositions free from the resin.

Because of the fineness of the silica flour employed as the base of the molding composition, it is possible to produce smooth castings in minute detail within tolerances of a few thousandths of an inch. Since the strength of the baked material is extremely high, it is possible to form molds having very thin walls thereby further facilitating the escape of air or gases through the mold walls during the pouring of a casting. Further the molds produced in accordance with this invention can be employed in the casting of many different types of metal including the ferrous metals as well as the non-ferrous metals.

Although this invention has been described with reference to a particular embodiment thereof, it is, of course, not to be limited thereto except in so far as is necessitated by the scope of the appended claims.

We claim as our invention:

1. A mold composition comprising, a mixture of 85% to 98% silica flour and 15% to 2% waterglass, and from 5 to 25 parts of water added to 100 parts of the mixture.

2. A mold composition comprising, a mixture of 92% to 98% silica flour and 8% to 2% waterglass, the silica flour having a particle size predominantly finer than 270 mesh, and from 5 to 25 parts of water added to 100 parts of the mixture.

3. A mold composition comprising, a mixture of 92% to 98% silica flour and 8% to 2% of a 32% sodium silicate solution, and from 5 to 25 parts of water added to 100 parts of the mixture.

4. A mold composition comprising, a mixture of about 96% silica flour having a particle size predominantly finer than 270 mesh and about 4% of a 32% sodium silicate solution, and from 10 to 25 parts of water added to 100 parts of the mixture.

5. A foundry mold comprising, a foraminous body formed of the residue of a mixture of 85% to 98% silica flour and 15% to 2% sodium silicate, and 5 to 25 parts of water to 100 parts of the mixture, treated at a temperature sufficient to remove substantially all of the volatile matter therefrom, the foraminous body having a smooth skin thereon.

6. A foundry mold comprising, a foraminous body formed of the residue of a mixture of 92% to 98% silica flour and 8% to 2% waterglass, and 5 to 25 parts of water to 100 parts of the mixture, treated at a temperature sufficient to remove substantially all of the volatile matter therefrom, the foraminous body having a smooth skin thereon.

7. A foundry mold comprising, a foraminous body formed of the residue of a mixture of 92% to 98% silica flour having a particle size predominantly finer than 270 mesh and 8% to 2% waterglass, and 5 to 25 parts of water to 100 parts of the mixture, treated at a temperature sufficient to remove substantially all of the volatile matter therefrom, the foraminous body having a smooth skin.

8. A foundry mold comprising, a foraminous body formed of the residue of a mixture of about 96% silica flour having a particle size predominantly finer than 270 mesh and about 4% of a 32% sodium silicate solution, and 10 to 25 parts of water to 100 parts of the mixture, treated at a temperature sufficient to remove substantially all of the volatile matter therefrom, the foraminous body having a homogeneous composition and a smooth skin.

9. A foundry mold comprising a foraminous body formed of the residue of a mixture of 85% to 98% silica flour and 15% to 2% sodium silicate, and from 2 to 15 parts of an organic binder and 5 to 25 parts of water to 100 parts of the mixture, treated at a temperature sufficient to remove substantially all of the volatile matter therefrom, the foraminous body having a smooth skin thereon.

10. A foundry mold composition comprising, a mixture of 85% to 98% silica flour and 15% to 2% waterglass, and from 2 to 15 parts of an organic binder and 5 to 25 parts of water added to 100 parts of the mixture of silica flour and waterglass.

JOHN B. SEASTONE.
WILLIAM E. MAHIN.

CERTIFICATE OF CORRECTION.

Patent No. 2,322,667.

June 22, 1943.

JOHN B. SEASTONE, ET AL.

It is hereby certified that error appears in the printed specification of the above numbered patent requiring correction as follows: Page 1, first column, lines 38, 39, 40 and 41, inclusive, strike out the words "with or without 2 to 15 parts by weight of pine resin or other organic binder added to 100 parts by weight of the mixture,"; and that the said Letters Patent should be read with this correction therein that the same may conform to the record of the case in the Patent Office.

Signed and sealed this 10th day of August, A. D. 1943.

Henry Van Arsdale,
Acting Commissioner of Patents.

(Seal)